March 23, 1965     H. A. SHAPIRO     3,174,780
THIMBLE FOR ROPE HAVING PREFORMED LOOP
Filed Dec. 20, 1962
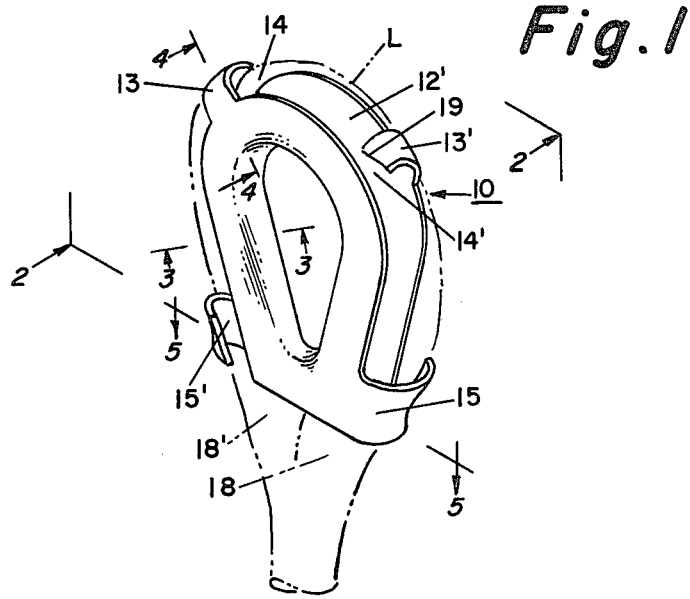
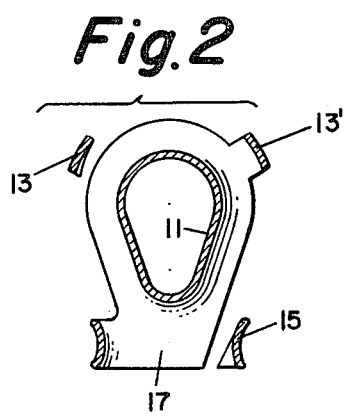
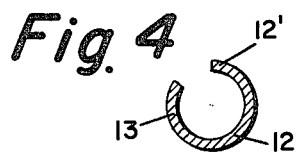
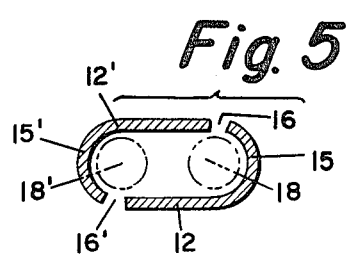
INVENTOR.
HYMAN A. SHAPIRO
BY
*J. F. Sheehan*
ATTORNEY

United States Patent Office 3,174,780
Patented Mar. 23, 1965

3,174,780
THIMBLE FOR ROPE HAVING PREFORMED LOOP
Hyman A. Shapiro, 124 Claybrook Drive,
Silver Spring, Md.
Filed Dec. 20, 1962, Ser. No. 246,664
1 Claim. (Cl. 287—81)
(Granted under Title 35, U.S. Code (1952), sec. 266)

The invention described herein may be manufactured and used by or for the Government of the United States of America for governmental purposes without the payment of any royalties thereon or therefor.

This invention relates to thimble devices which are assembled with ropes to provide a loop or eye of substantial strength for receiving a clevis or other connection for hoisting, anchoring or otherwise subjecting objects to heavy loads. The invention is concerned with a unitary or endless thimble construction which is designed especially for assembly with a loop which is preformed of rope material, such, for example, as a loop which is preformed in braided nylon rope material.

Generally, in the prior art constructions of thimbles, a rope strand is disposed about the outer periphery of a thimble and the strand secured to the thimble in some manner to form the loop. This has been accomplished with wire rope, for example, by welding the strand to metal thimble structure, or by lapping the terminal ends of wire or manila rope and then clamping the lapped ends. Other developments in the prior art are the provision of lugs or ears on the thimbles which are used to clamp the strand about the thimble to form the loop. An example of the latter thimble construction is found in Patent 2,100,569 to W. C. Russell issued November 30, 1937. In general, the prior art of unitary or endless thimble constructions requires that the rope be applied in strand form to the thimble and the loop or eye formed thereafter. Some prior art thimble constructions, which are capable of receiving preformed rope loops, are formed of separable sections and require some type of clamp construction to secure the sections together.

An object of this invention is to provide a unitary or endless thimble device which is designed to receive a preformed loop of rope material and maintain the thimble and rope material assembled without the use of clamping or securing means.

Another object is to provide a unitary or endless thimble device which is designed to receive a preformed loop of resilient cordage or rope material and to maintain the elements assembled without the application of positive securing means.

Still another object is to provide a unitary or endless thimble device which is designed to receive a preformed loop of braided nylon cordage or rope having substantial resiliency and to maintain the elements assembled without the use of positive clamping or securing means.

Other objects, advantages and features of the invention will become apparent from the following detailed description of the invention when considered in conjunction with the accompanying drawings, wherein:

FIG. 1 is a view in perspective of the thimble device with resilient braided material attached;

FIG. 2 is a sectional view of the thimble device;

FIG. 3 is a sectional view taken on the line 3—3 of FIG. 1;

FIG. 4 is a sectional view taken on the line 4—4 of FIG. 1;

FIG. 5 is a sectional view taken on the line 5—5 of FIG. 1.

In FIGS. 1 and 2, the thimble is indicated at 10 and is disposed in a vertical operative position, and its various parts will be described with reference to this vertical position. The thimble is preferably formed of an aluminum bronze body portion 11 indicated in FIG. 2 which is of general ovate shape providing a central eye having a continuous or endless inner surface and opposed outwardly extending side flanges 12—12' which are continuous of endless and, as indicated in FIG. 1, form an outer channel or groove therebetween. The general shape of the channel or groove is shown by the configuration of the sectional view of FIG. 3, but this configuration is modified by extensions or lugs on one or both of flanges 12—12'. For example, two such lugs 13—13' are shown on the upper portion of the thimble and as shown in FIG. 4 the lug 13 is integral with and extends inwardly from flange 12 toward the flange 12' while the lug 13' is integral with and extends from flange 12' toward flange 12. As will be seen from FIG. 1, the lugs 13 and 13' provide spaces 14 and 14' with the respective flanges 12' and 12. The thimble in its lower portion is of general elliptical configuration, as shown in the sectional view of FIG. 5, and is provided with extensions or lugs 15—15'. The lug 15 is integral with the flange 12 and forms a space 16 with the flange 12' while the lug 15' is integral with the flange 12' and forms a space 16' with the flange 12. By the provision of the lugs 15—15' at the lower end of the thimble an elliptical mouth 17 is provided as indicated in FIG. 2 which forms an enlarged space for receiving the lapped ends 18—18' of the loop L which is shown in broken lines in FIG. 1. The lugs are generally arcuate or curved and are bowed outwardly from the flanges permitting the rope material to be received in the channel and partially embraced by the lugs.

The spaces 14—14' between lugs 13—13' and the flanges 12—12' will preferably be arranged in alternation and the spaces 16—16' between the lugs 15—15' and the flanges 12—12' arranged in alternation and all spaces will be somewhat narrower than the diameter of the rope material from which the loop L is formed in order to retain the loop within the thimble groove after the loop has been applied. The loop will be applied manually by compressing the rope material sufficiently to permit its forced entry through the spaces 14—14' and 16—16' into the groove formed between the flanges 12—12' after which the rope material, due to its resiliency, will expand and be retained. It has been found that loops formed of braided rope material, such as braided nylon, is readily compressible and applied to the thimble and consequently the spaces 14—14' and 16—16' may be substantially narrower than the normal diameter of this rope material. However, twisted rope material such as twisted nylon is less resilient and it may be desirable to vary or graduate the width of the spaces by flaring or tapering the free end of the extensions or lugs to readily receive this type of rope material. Such a detail is shown in connection with the lug 13' in FIG. 1 wherein its free end indicated at 19 is disposed at an angle to the flange 12' and gradually widens the space 14' providing an enlarged front mouth or throat zone through which the loop L may be first inserted and progressively forced through the space toward the narrower rear zone and into the channel or groove. It will be understood that each lug will be modified as shown in connection with lug 13' and that the loop will be applied by threading it onto the thimble by starting, for example, with space 16' and finishing with space 16.

Obviously many modifications and variations of the present invention are possible in the light of the above teachings. It is therefore to be understood that within the scope of the appended claims the invention may be practiced otherwise than as specifically described.

I claim:

The combination which comprises, (a) a rope thimble formed of an ovate shaped endless rigid body having a central eye, (b) a pair of endless flanges integral with said body and extending outwardly therefrom in spaced parallel relation providing a continuous peripheral channel therebetween, (c) a first set of outwardly bowed lugs integral with one flange and each lug having a free end providing a space with the other flange, (d) a second set of outwardly bowed lugs integral with the other flange and each lug having a free end providing a space with said one flange, (e) one lug of the first set being positioned on one side of the rigid body at its narrow end and one lug of the second set being positioned on the other side of the rigid body at its narrow end providing with the channel an enlarged mouth, (f) a preformed loop having a lapped joint and formed of compressible rope having a diameter greater than the width of the spaces between the lug ends and the flanges and (g) said loop being forced into the peripheral channel by compressing it through the spaces to position the lapped joint in the enlarged mouth of the thimble whereby the loop is maintained in generally fixed position within the channel.

References Cited by the Examiner

UNITED STATES PATENTS

| 646,091 | 3/00 | Hammond | 287—81 |
| 1,244,658 | 10/17 | Sunderland | 287—81 |
| 1,550,900 | 8/25 | Goodspeed | 287—81 |
| 2,100,569 | 11/37 | Russell | 287—81 |
| 2,877,527 | 3/59 | Bond | 24—123 |

FOREIGN PATENTS

| 4,455 | 3/00 | Great Britain. |

CARL W. TOMLIN, *Primary Examiner.*